M. A. HEYDECKER.
AMBULANCE COACH.
APPLICATION FILED SEPT. 27, 1909.
980,780.
Patented Jan. 3, 1911.
3 SHEETS—SHEET 2.
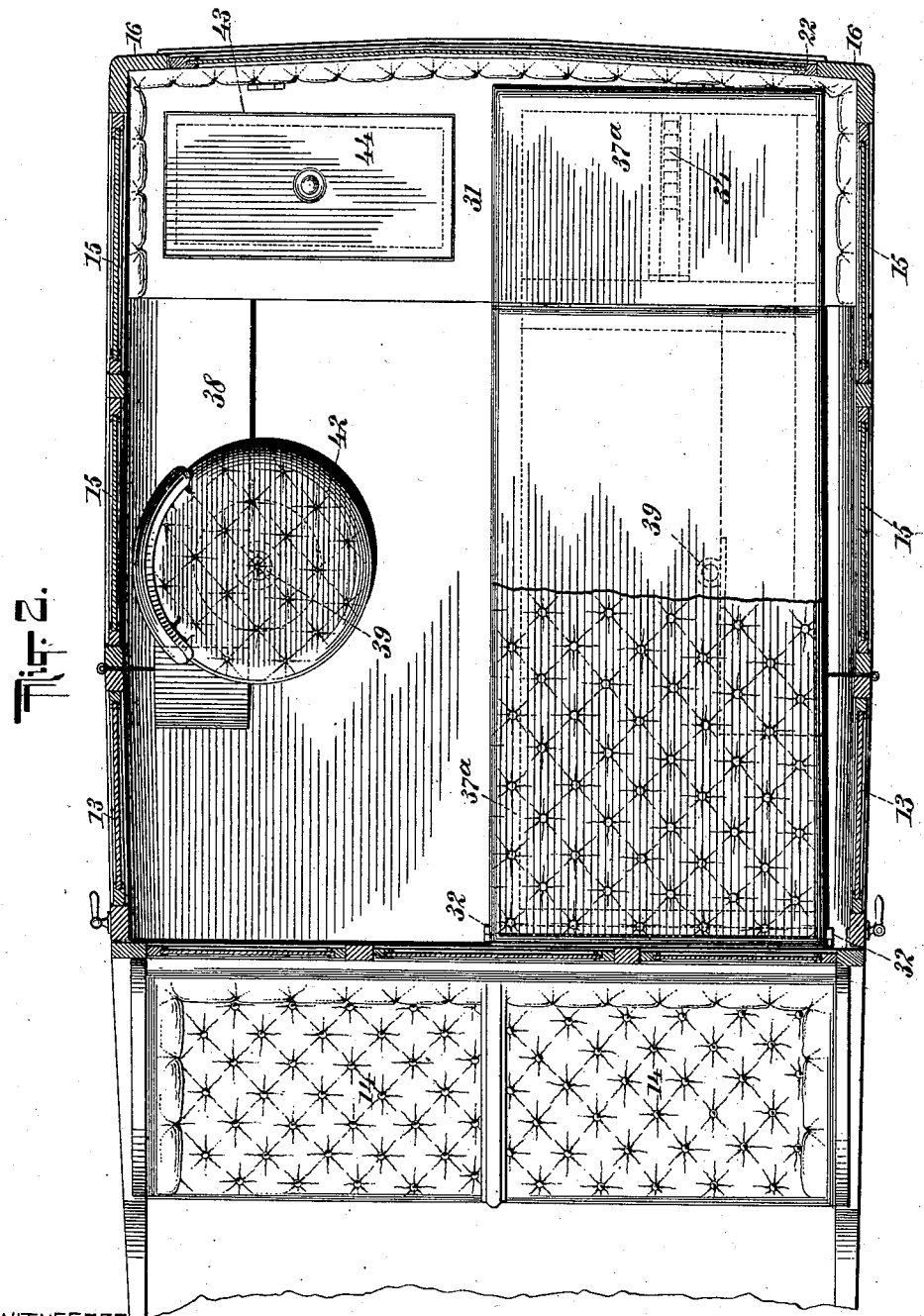
WITNESSES:
INVENTOR
Mary A. Heydecker
BY
her ATTORNEY.

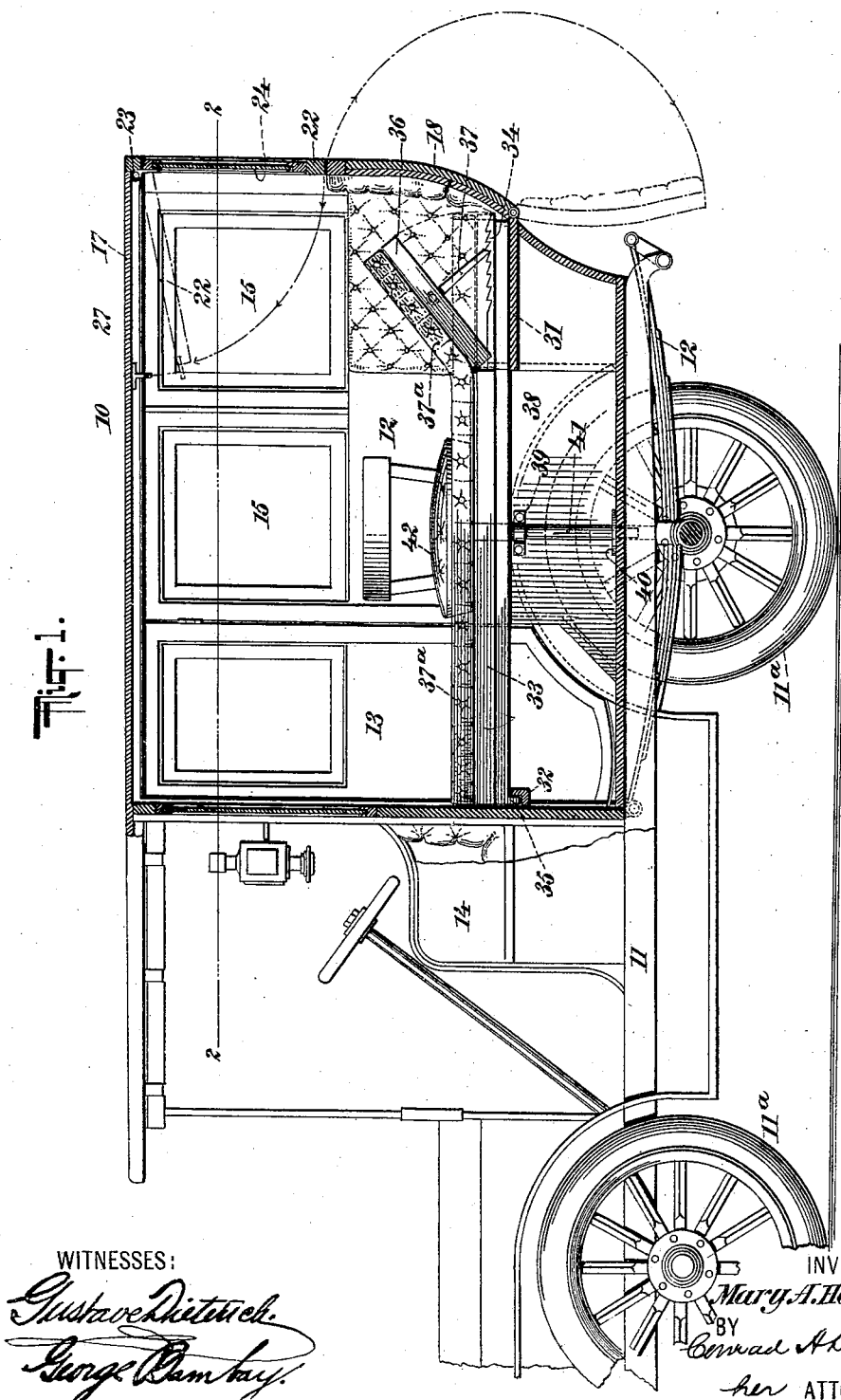

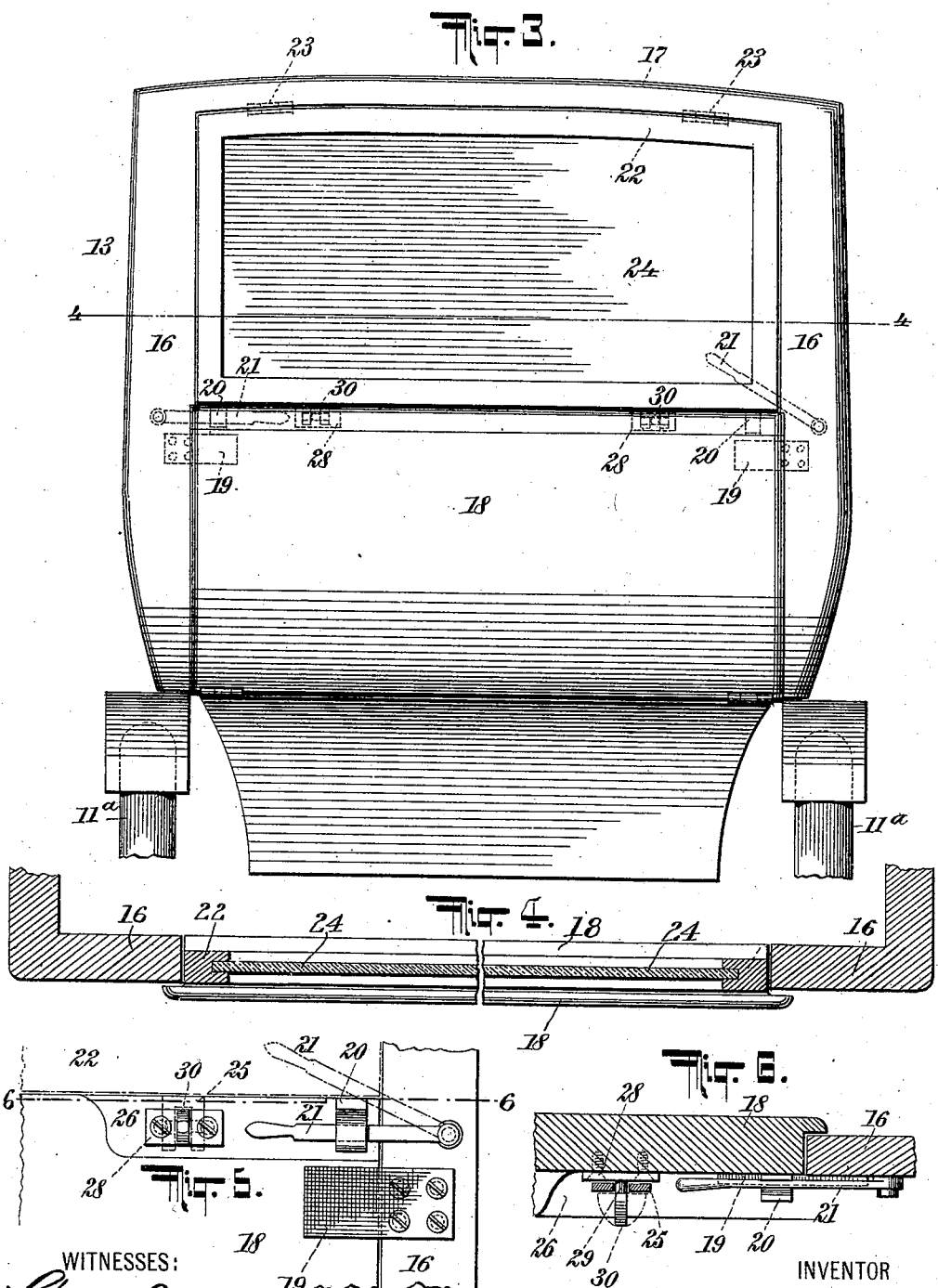

UNITED STATES PATENT OFFICE.

MARY A. HEYDECKER, OF NEW YORK, N. Y.

AMBULANCE-COACH.

980,780.   Specification of Letters Patent.   Patented Jan. 3, 1911.

Application filed September 27, 1909. Serial No. 519,750.

*To all whom it may concern:*

Be it known that I, MARY A. HEYDECKER, a citizen of the United States, residing at the city of New York, borough of Manhattan, in the county and State of New York, have invented certain new and useful Improvements in Ambulance-Coaches, of which the following is a full, clear, and exact specification.

My invention relates to improvements in means for transporting invalids, and the same has for its object more particularly to provide a vehicle having the external appearance of an ordinary automobile, and which is so constructed that the same may be used either as a pleasure vehicle or as an ambulance, as desired.

Further, said invention has for its object to provide an ambulance coach in which access may be had thereto from both of its sides and from the rear thereof.

Further, said invention has for its object to provide an automobile ambulance coach which is so constructed that the litter or bed may be introduced into the body thereof from the back of the vehicle, and supported within said body at one side thereof, partly upon the rear seat, and partly upon a support provided upon the inner side of the front of the vehicle body.

To the attainment of the aforesaid object and ends, my invention consists in the novel details of construction, and in the combination, connection and arrangement of parts hereinafter more fully described and then pointed out in the claims.

In the accompanying drawings, forming a part of this specification, wherein like numerals of reference indicate like parts, Figure 1 is a side view partly broken away and in section showing one form of ambulance coach made according to, and embodying my said invention; Fig. 2 is a section taken on the line 2—2; Fig. 3 is a rear or end view of the same; Fig. 4 is an enlarged section on the line 4—4 of Fig. 3; Fig. 5 is an enlarged detail side view showing one of the resilient plates, and one of the locking devices for the lower hinged back section, and Fig. 6 is a detail section taken on line 6—6 of Fig. 5.

In said drawings 10 designates the vehicle as a whole, comprising a frame 11 provided with wheels 11ª 11ª mounted upon springs 12 12, in the usual manner.

13 denotes the body of the vehicle provided at its front with a seat 14 for the driver, and upon the opposite sides of said body to the rear of the driver's seat 14 are provided hinged doors 13 13, and a plurality of windows 15 15. The rear portion of the body is composed of two vertical ends or sides 16 16 which extend from the bottom of the body 13 to the top 17 thereof, and intermediate said sides is arranged a solid lower portion 18 which is hinged at its lower edge to the bottom of the vehicle, and upon the inner sides of said ends 16 16 are secured horizontal resilient members 19 19 having their free portions extending inward beyond the inner edges of the ends or sides 16 16 which stops serve to limit the inward movement of the hinged back portion 17, and hold the same against vibration. Upon the inner side of said lower portion 18, adjacent to its upper edge are provided hook members 20 20, and upon the inner sides of the ends 16 16 are pivotally secured levers 21 21 adapted to engage with said hooks 20 20 on said lower portion 18 whereby to hold the same secured in position intermediate said ends 16 16. The upper edge of the lower back portion 18 is rabbeted as are also the opposite edges of the ends 16 16 above said lower back portion 18.

22 denotes a frame which is pivotally secured along its upper edge by hinges 23 23 to the top of the vehicle body which frame is adapted to fit into the rabbeted portions of the ends 16 16, and the lower hinged back portion 18. The frame 22 is provided with a glass or transparent section 24, and upon its inner side at its lower edge said frame is provided with bifurcated members 25 25, which are adapted to engage securing devices 26 26 arranged upon the inner surface of the lower hinged back portion 18, whereby to secure said frame in its closed position, or to engage with similar securing devices 27 27 provided upon the under-side of the top of the body 13, whereby to secure said hinged frame in its raised open position. The securing devices 26 and 27 are each composed of a base 28 having a flat projecting portion 29 extending outwardly from said base, and a flat revoluble head 30 arranged to work upon said projection 29.

31 denotes a seat provided at the rear of the body portion, adapted to receive a pair of cushions which serve completely to cover said seat 31 when the vehicle is used as a pleasure vehicle, and upon the inner-side of the front of the body 13 in the same horizontal plane with the top of the seat 31 is secured a recessed bracket or support 32.

33 denotes a frame provided adjacent to one end with a downwardly extending projection 35 which is adapted to be received by the recessed bracket or support 32, and at its other end with a hinged portion 36 provided with a pivoted brace 37 adapted to engage the rack 34, and 37ᵃ denotes a mattress disposed upon said frame 33 and hinged portion 36.

Upon the inner-sides of the wheel-housings 38 are secured eyes 39 39, and in the floor of the vehicle body directly below said eyes 39 39 are provided sockets 40 40. Each of said eyes 39 with its socket 40 therebelow is adapted to receive the spindle 41 of a chair 42.

Below the rear seat 31 is provided a metal lined receptacle 43 provided with a removable cover 44 adapted to receive ice or other material.

The operation of the vehicle is as follows: When the same is to be used as a pleasure car it merely becomes necessary to remove the bed frame 33 and mattress 37ᵃ, and place a cushion upon the back seat 31 to occupy the place previously used to support one end of the frame 33, and then insert the spindle 41 of a chair 42 into the eye 39 and socket 40 provided below the bed frame 33. When the vehicle is to be used for ambulance purposes, the left hand cushion and revolving chair 42 must be removed, and thereupon the hinged upper back section 22 raised and secured against the top of the vehicle, and then the locking devices 21 of the lower back section released, and said lower section dropped, as indicated by dotted lines at Fig. 1. Hereupon the bed frame 33 with its mattress 37ᵃ thereon are inserted into the body, and the projection at the lower end of said frame disposed within the recessed bracket 32. Hereupon the lower back section 18 is again raised and secured in position by the locking devices 21 21. When the said back is secured in its closed position, its inner upholstered or padded surface will contact with the upper end of the bed frame 33 and hold the same firmly in place upon said bracket 32 and rear seat 31. The hinged top section 22 is then lowered and secured by the locking devices 26 26 to the lower section 18.

Having thus described my invention, what I claim and desire to secure by Letters Patent is:

1. An automobile ambulance comprising a frame and running gear, body mounted upon said frame, side doors in said body, supports arranged at the opposite ends of said body, a bed frame disposed upon said supports, a back comprising a pair of hinged sections, one of said sections being pivotally secured at its lower edge to said body, and the other of said sections pivotally secured along its upper edge to said body, resilient members adapted to engage said first-named hinged section, adjacent to its upper edge, and means for securing said hinged sections together and holding said bed frame in place upon said supports, substantially as specified.

2. An automobile ambulance comprising a frame and running gear, a body mounted on said frame, side doors in said body, supports arranged adjacent to the opposite ends of said body, a bed frame disposed upon said supports, a back comprising a pair of hinged sections, one of said sections being pivotally secured at its lower edge to said vehicle body adjacent to the support at the rear thereof, and the other of said sections pivotally secured along its upper edge to said body portion, locking means arranged upon said body adapted to engage said first-named hinged section, adjacent to its upper edge, for securing the same in position, and means arranged partly upon said first-named hinged section, and partly upon the other of said hinged sections, for securing said hinged sections together, substantially as specified.

3. An automobile ambulance comprising a frame and running gear, a body mounted upon said frame, side doors in said body, a recessed support secured within said body at the front thereof, a support arranged in said body at the rear thereof, a bed frame adapted to rest upon said supports provided at one end with means adapted to engage said recessed support, a back comprising vertical end members, and upper and lower hinged sections arranged intermediate said end members, the lower of said hinged sections being pivotally secured at its lower edge to said body adjacent to the top of said rear support and the upper of said sections being pivotally secured along its upper edge to said body portion adjacent to the top thereof, resilient members arranged upon said end members adapted to engage said lower hinged section adjacent to its upper edge, locking means for securing said hinged section in position intermediate said end members and holding said bed frame in position upon said supports, and locking means for securing said upper hinged section to said lower hinged section, substantially as specified.

Signed at the city of New York, borough of Manhattan, in the county and State of New York, this fourth day of June, 1909.

MARY A. HEYDECKER.

Witnesses:
 THOS. F. BARRY.
 GEORGE BAMBAY.